United States Patent
Matuk et al.

(10) Patent No.: US 11,097,723 B2
(45) Date of Patent: Aug. 24, 2021

(54) USER INTERFACES FOR VEHICLE REMOTE PARK ASSIST

(71) Applicant: Ford Global Technologies, LLC, Dearborn, MI (US)

(72) Inventors: Cinderella Matuk, Cologne (DE); Markus Krekel, Wermelskirchen (DE); Ahmed Benmimoun, Aachen (DE); Gabrielle Jost, Niederzier (DE); Erick Michael Lavoie, Dearborn, MI (US); Frank Mast, Mannheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 178 days.

(21) Appl. No.: 16/163,207

(22) Filed: Oct. 17, 2018

(65) Prior Publication Data
US 2020/0122716 A1    Apr. 23, 2020

(51) Int. Cl.
| | | |
|---|---|---|
| *B60W 30/06* | (2006.01) | |
| *G05D 1/00* | (2006.01) | |
| *G08G 1/16* | (2006.01) | |
| *G06F 3/0481* | (2013.01) | |

(Continued)

(52) U.S. Cl.
CPC .......... *B60W 30/06* (2013.01); *G05D 1/0016* (2013.01); *G05D 1/0022* (2013.01); *G05D 1/0038* (2013.01); *G05D 1/0088* (2013.01); *G06F 3/0484* (2013.01); *G06F 3/04817* (2013.01); *G06F 3/04886* (2013.01); *G08G 1/168* (2013.01); *G05D 2201/0213* (2013.01)

(58) Field of Classification Search
CPC ............................ B60W 30/06; G05D 1/0016
See application file for complete search history.

(56) References Cited

U.S. PATENT DOCUMENTS

| | | |
|---|---|---|
| 5,959,724 A | 9/1999 | Izumi |
| 6,275,754 B1 | 8/2001 | Shimizu |
| 6,356,828 B1 | 3/2002 | Shimizu |

(Continued)

FOREIGN PATENT DOCUMENTS

| | | |
|---|---|---|
| CN | 101929921 A | 12/2010 |
| CN | 103818204 A | 5/2014 |

(Continued)

OTHER PUBLICATIONS

US 9,772,406 B2, 09/2017, Liu (withdrawn)

(Continued)

*Primary Examiner* — Anne Marie Antonucci
*Assistant Examiner* — Abdalla A Khaled
(74) *Attorney, Agent, or Firm* — Frank Lollo; Eversheds Sutherland (US) LLP (57) ABSTRACT

Method and apparatus are disclosed for user interfaces for vehicle remote park-assist. An example remote park-assist system includes a mobile app. The mobile app includes an interface for a touchscreen of a mobile device. The interface includes a pushbutton for receiving a continuous stationary input and an input pad for receiving a dynamic input sequence. The example remote park-assist system also includes a communication module for communication with the mobile device and an autonomy unit to perform motive functions while the interface simultaneously receives the continuous stationary input and the dynamic input sequence.

20 Claims, 5 Drawing Sheets

(51) Int. Cl.
*G06F 3/0484* (2013.01)
*G06F 3/0488* (2013.01)

(56) References Cited

U.S. PATENT DOCUMENTS

| | | |
|---|---|---|
| 6,452,617 B1 | 9/2002 | Bates |
| 6,476,730 B2 | 11/2002 | Kakinami |
| 6,477,260 B1 | 11/2002 | Shimomura |
| 6,657,555 B2 | 12/2003 | Shimizu |
| 6,683,539 B2 | 1/2004 | Trajkovic |
| 6,724,322 B2 | 4/2004 | Tang |
| 6,744,364 B2 | 6/2004 | Wathen |
| 6,768,420 B2 | 7/2004 | McCarthy |
| 6,801,855 B1 | 10/2004 | Walters |
| 6,850,844 B1 | 1/2005 | Walters |
| 6,850,148 B2 | 2/2005 | Masudaya |
| 6,927,685 B2 | 8/2005 | Wathen |
| 6,997,048 B2 | 2/2006 | Komatsu |
| 7,042,332 B2 | 5/2006 | Takamura |
| 7,123,167 B2 | 10/2006 | Staniszewski |
| 7,307,655 B1 | 12/2007 | Okamoto |
| 7,663,508 B2 | 2/2010 | Teshima |
| 7,737,866 B2 | 6/2010 | Wu |
| 7,813,844 B2 | 10/2010 | Gensler |
| 7,825,828 B2 | 11/2010 | Watanabe |
| 7,834,778 B2 | 11/2010 | Browne |
| 7,847,709 B2 | 12/2010 | McCall |
| 7,850,078 B2 | 12/2010 | Christenson |
| 7,924,483 B2 | 4/2011 | Smith |
| 8,035,503 B2 | 10/2011 | Partin |
| 8,054,169 B2 | 11/2011 | Bettecken |
| 8,098,146 B2 | 1/2012 | Petrucelli |
| 8,126,450 B2 | 2/2012 | Howarter |
| 8,164,628 B2 | 4/2012 | Stein |
| 8,180,524 B2 | 5/2012 | Eguchi |
| 8,180,547 B2 | 5/2012 | Prasad |
| 8,224,313 B2 | 7/2012 | Howarter |
| 8,229,645 B2 | 7/2012 | Lee |
| 8,242,884 B2 | 8/2012 | Holcomb |
| 8,335,598 B2 | 12/2012 | Dickerhoof |
| 8,401,235 B2 | 3/2013 | Lee |
| 8,493,236 B2 | 7/2013 | Boehme |
| 8,538,408 B2 | 9/2013 | Howarter |
| 8,542,130 B2 | 9/2013 | Lavoie |
| 8,552,856 B2 | 10/2013 | McRae |
| 8,587,681 B2 | 11/2013 | Guidash |
| 8,594,616 B2 | 11/2013 | Gusikhin |
| 8,599,043 B2 | 12/2013 | Kadowaki |
| 8,618,945 B2 | 12/2013 | Furuta |
| 8,645,015 B2 | 2/2014 | Oetiker |
| 8,655,551 B2 | 2/2014 | Danz |
| 8,692,773 B2 | 4/2014 | You |
| 8,706,350 B2 | 4/2014 | Talty |
| 8,725,315 B2 | 5/2014 | Talty |
| 8,742,947 B2 | 6/2014 | Nakazono |
| 8,744,684 B2 | 6/2014 | Hong |
| 8,780,257 B2 | 7/2014 | Gidon |
| 8,787,868 B2 | 7/2014 | Leblanc |
| 8,825,262 B2 | 9/2014 | Lee |
| 8,933,778 B2 | 1/2015 | Birkel |
| 8,957,786 B2 | 2/2015 | Stempnik |
| 8,994,548 B2 | 3/2015 | Gaboury |
| 8,995,914 B2 | 3/2015 | Nishidai |
| 9,008,860 B2 | 4/2015 | Waldock |
| 9,014,920 B1 | 4/2015 | Torres |
| 9,078,200 B2 | 7/2015 | Wuergler |
| 9,086,879 B2 | 7/2015 | Gautama |
| 9,141,503 B1 | 9/2015 | Chen |
| 9,147,065 B2 | 9/2015 | Lauer |
| 9,154,920 B2 | 10/2015 | O'Brien |
| 9,168,955 B2 | 10/2015 | Noh |
| 9,193,387 B2 | 11/2015 | Auer |
| 9,225,531 B2 | 12/2015 | Hachey |
| 9,230,439 B2 | 1/2016 | Boulay |
| 9,233,710 B2 | 1/2016 | Lavoie |
| 9,273,966 B2 | 3/2016 | Bartels |
| 9,275,208 B2 | 3/2016 | Protopapas |
| 9,283,960 B1 | 3/2016 | Lavoie |
| 9,286,803 B2 | 3/2016 | Tippelhofer |
| 9,302,675 B2 | 4/2016 | Schilling |
| 9,318,022 B2 | 4/2016 | Barth |
| 9,379,567 B2 | 6/2016 | Kracker |
| 9,381,859 B2 | 7/2016 | Nagata |
| 9,429,657 B2 | 8/2016 | Sidhu |
| 9,429,947 B1 | 8/2016 | Wengreen |
| 9,454,251 B1 | 9/2016 | Guihot |
| 9,469,247 B2 | 10/2016 | Juneja |
| 9,493,187 B2 | 11/2016 | Pilutti |
| 9,506,774 B2 | 11/2016 | Shutko |
| 9,511,799 B2 | 12/2016 | Lavoie |
| 9,522,675 B1 | 12/2016 | You |
| 9,529,519 B2 | 12/2016 | Blumenberg |
| 9,557,741 B1 | 1/2017 | Elie |
| 9,563,990 B2 | 2/2017 | Khan |
| 9,595,145 B2 | 3/2017 | Avery |
| 9,598,051 B2 | 3/2017 | Okada |
| 9,606,241 B2 | 3/2017 | Varoglu |
| 9,616,923 B2 | 4/2017 | Lavoie |
| 9,637,117 B1 | 5/2017 | Gusikhin |
| 9,651,655 B2 | 5/2017 | Feldman |
| 9,656,690 B2 | 5/2017 | Shen |
| 9,666,040 B2 | 5/2017 | Flaherty |
| 9,688,306 B2 | 6/2017 | McClain |
| 9,701,280 B2 | 7/2017 | Schussmann |
| 9,712,977 B2 | 7/2017 | Tu |
| 9,715,816 B1 | 7/2017 | Adler |
| 9,725,069 B2 | 8/2017 | Krishnan |
| 9,731,714 B2 | 8/2017 | Kiriya |
| 9,731,764 B2 | 8/2017 | Baek |
| 9,754,173 B2 | 9/2017 | Kim |
| 9,809,218 B2 | 11/2017 | Elie |
| 9,811,085 B1 | 11/2017 | Hayes |
| 9,842,444 B2 | 12/2017 | Van Wiemeersch |
| 9,845,070 B2 | 12/2017 | Petel |
| 9,846,431 B2 | 12/2017 | Petel |
| 9,914,333 B2 | 3/2018 | Shank |
| 9,921,743 B2 | 3/2018 | Bryant |
| 9,946,255 B2 | 4/2018 | Matters |
| 9,959,763 B2 | 5/2018 | Miller |
| 9,971,130 B1 | 5/2018 | Lin |
| 9,975,504 B2 | 5/2018 | Dalke |
| 10,019,001 B2 | 7/2018 | Dang Van Nhan |
| 10,032,276 B1 | 7/2018 | Liu |
| 10,040,482 B1 | 8/2018 | Jung |
| 10,043,076 B1 | 8/2018 | Zhang |
| 10,131,347 B2 | 11/2018 | Kim |
| 10,192,113 B1 | 1/2019 | Liu |
| 10,246,055 B2 | 4/2019 | Farges |
| 10,268,341 B2 | 4/2019 | Kocienda |
| 2003/0060972 A1 | 3/2003 | Kakinami |
| 2003/0098792 A1 | 5/2003 | Edwards |
| 2003/0133027 A1 | 7/2003 | Itoh |
| 2005/0030156 A1 | 2/2005 | Alfonso |
| 2005/0068450 A1 | 3/2005 | Steinberg |
| 2005/0099275 A1 | 5/2005 | Kamdar |
| 2006/0010961 A1 | 1/2006 | Gibson |
| 2006/0227010 A1 | 10/2006 | Berstis |
| 2006/0235590 A1 | 10/2006 | Bolourchi |
| 2007/0230944 A1 | 10/2007 | Georgiev |
| 2008/0027591 A1 | 1/2008 | Lenser |
| 2008/0154464 A1 | 6/2008 | Sasajima |
| 2008/0154613 A1 | 6/2008 | Haulick |
| 2008/0238643 A1 | 10/2008 | Malen |
| 2008/0306683 A1 | 12/2008 | Ando |
| 2009/0096753 A1 | 4/2009 | Lim |
| 2009/0098907 A1 | 4/2009 | Huntzicker |
| 2009/0115639 A1 | 5/2009 | Proefke |
| 2009/0125181 A1 | 5/2009 | Luke |
| 2009/0125311 A1 | 5/2009 | Haulick |
| 2009/0128315 A1 | 5/2009 | Griesser |
| 2009/0146813 A1 | 6/2009 | Nuno |
| 2009/0174574 A1 | 7/2009 | Endo |
| 2009/0241031 A1 | 9/2009 | Gamaley |
| 2009/0289813 A1 | 11/2009 | Kwiecinski |

(56) References Cited

U.S. PATENT DOCUMENTS

| | | |
|---|---|---|
| 2009/0309970 A1 | 12/2009 | Ishii |
| 2009/0313095 A1 | 12/2009 | Hurpin |
| 2010/0025942 A1 | 2/2010 | Mangaroo |
| 2010/0061564 A1 | 3/2010 | Clemow |
| 2010/0114471 A1 | 5/2010 | Sugiyama |
| 2010/0114488 A1 | 5/2010 | Khamharn |
| 2010/0136944 A1 | 6/2010 | Taylor |
| 2010/0152972 A1 | 6/2010 | Attard |
| 2010/0156672 A1 | 6/2010 | Yoo |
| 2010/0245277 A1 | 9/2010 | Nakao |
| 2010/0259420 A1 | 10/2010 | Von Rehyer |
| 2011/0071725 A1 | 3/2011 | Kleve |
| 2011/0082613 A1 | 4/2011 | Oetiker |
| 2011/0190972 A1 | 8/2011 | Timmons |
| 2011/0205088 A1 | 8/2011 | Baker |
| 2011/0253463 A1 | 10/2011 | Smith |
| 2011/0309922 A1 | 12/2011 | Ghabra |
| 2012/0007741 A1 | 1/2012 | Laffey |
| 2012/0072067 A1 | 3/2012 | Jecker |
| 2012/0083960 A1 | 4/2012 | Zhu |
| 2012/0173080 A1 | 7/2012 | Cluff |
| 2012/0176332 A1 | 7/2012 | Fujibayashi |
| 2012/0271500 A1 | 10/2012 | Tsimhoni |
| 2012/0303258 A1 | 11/2012 | Pampus |
| 2012/0323643 A1 | 12/2012 | Volz |
| 2012/0323700 A1 | 12/2012 | Aleksandrovich |
| 2013/0021171 A1 | 1/2013 | Hsu |
| 2013/0024202 A1 | 1/2013 | Harris |
| 2013/0043989 A1 | 2/2013 | Niemz |
| 2013/0073119 A1 | 3/2013 | Huger |
| 2013/0109342 A1 | 5/2013 | Welch |
| 2013/0110342 A1 | 5/2013 | Wuttke |
| 2013/0113936 A1 | 5/2013 | Cohen |
| 2013/0124061 A1 | 5/2013 | Khanafer |
| 2013/0145441 A1 | 6/2013 | Mujumdar |
| 2013/0211623 A1 | 8/2013 | Thompson |
| 2013/0231824 A1 | 9/2013 | Wilson |
| 2013/0289825 A1 | 10/2013 | Noh |
| 2013/0314502 A1 | 11/2013 | Urbach |
| 2013/0317944 A1 | 11/2013 | Huang |
| 2014/0052323 A1 | 2/2014 | Reichel |
| 2014/0095994 A1 | 4/2014 | Kim |
| 2014/0096051 A1 | 4/2014 | Boblett |
| 2014/0121930 A1 | 5/2014 | Allexi |
| 2014/0147032 A1 | 5/2014 | Yous |
| 2014/0156107 A1 | 6/2014 | Karasawa |
| 2014/0188339 A1 | 7/2014 | Moon |
| 2014/0222252 A1 | 8/2014 | Matters |
| 2014/0240502 A1 | 8/2014 | Strauss |
| 2014/0282931 A1 | 9/2014 | Protopapas |
| 2014/0297120 A1 | 10/2014 | Cotgrove |
| 2014/0300504 A1 | 10/2014 | Shaffer |
| 2014/0303839 A1 | 10/2014 | Filev |
| 2014/0320318 A1 | 10/2014 | Victor |
| 2014/0327736 A1 | 11/2014 | DeJohn |
| 2014/0350804 A1 | 11/2014 | Park |
| 2014/0350855 A1 | 11/2014 | Vishnuvajhala |
| 2014/0365108 A1 | 12/2014 | You |
| 2014/0365126 A1 | 12/2014 | Vulcano |
| 2015/0022468 A1 | 1/2015 | Cha |
| 2015/0039173 A1 | 2/2015 | Beaurepaire |
| 2015/0039224 A1 | 2/2015 | Tuukkanen |
| 2015/0048927 A1 | 2/2015 | Simmons |
| 2015/0066545 A1 | 3/2015 | Kotecha |
| 2015/0077522 A1 | 3/2015 | Suzuki |
| 2015/0088360 A1* | 3/2015 | Bonnet ............... B60W 30/06 701/23 |
| 2015/0091741 A1 | 4/2015 | Stefik |
| 2015/0109116 A1 | 4/2015 | Grimm |
| 2015/0116079 A1 | 4/2015 | Mishra |
| 2015/0123818 A1 | 5/2015 | Sellschopp |
| 2015/0127208 A1 | 5/2015 | Jecker |
| 2015/0149265 A1 | 5/2015 | Huntzicker |
| 2015/0151789 A1 | 6/2015 | Lee |
| 2015/0153178 A1 | 6/2015 | Koo |
| 2015/0161890 A1 | 6/2015 | Huntzicker |
| 2015/0163649 A1 | 6/2015 | Chen |
| 2015/0197278 A1 | 7/2015 | Boos |
| 2015/0203111 A1 | 7/2015 | Bonnet |
| 2015/0203156 A1 | 7/2015 | Hafner |
| 2015/0210317 A1 | 7/2015 | Hafner |
| 2015/0217693 A1 | 8/2015 | Pliefke |
| 2015/0219464 A1 | 8/2015 | Beaurepaire |
| 2015/0220791 A1 | 8/2015 | Wu |
| 2015/0226146 A1 | 8/2015 | Elwart |
| 2015/0274016 A1 | 10/2015 | Kinoshita |
| 2015/0286340 A1 | 10/2015 | Send |
| 2015/0329081 A1* | 11/2015 | Morita ............... H04W 4/023 701/2 |
| 2015/0329110 A1 | 11/2015 | Stefan |
| 2015/0344028 A1 | 12/2015 | Gieseke |
| 2015/0346727 A1 | 12/2015 | Ramanujam |
| 2015/0360720 A1 | 12/2015 | Li |
| 2015/0365401 A1 | 12/2015 | Brown |
| 2015/0371541 A1 | 12/2015 | Korman |
| 2015/0375741 A1* | 12/2015 | Kiriya ............... G06K 9/00355 701/2 |
| 2015/0375742 A1 | 12/2015 | Gebert |
| 2016/0012653 A1 | 1/2016 | Soroka |
| 2016/0012726 A1 | 1/2016 | Wang |
| 2016/0018821 A1 | 1/2016 | Akita |
| 2016/0055749 A1 | 2/2016 | Nicoll |
| 2016/0153778 A1 | 2/2016 | Singh |
| 2016/0062354 A1 | 3/2016 | Li |
| 2016/0068158 A1 | 3/2016 | Elwart |
| 2016/0068187 A1 | 3/2016 | Hata |
| 2016/0075369 A1 | 3/2016 | Lavoie |
| 2016/0090055 A1 | 3/2016 | Breed |
| 2016/0107689 A1 | 4/2016 | Lee |
| 2016/0112846 A1 | 4/2016 | Siswick |
| 2016/0114726 A1 | 4/2016 | Nagata |
| 2016/0117926 A1 | 4/2016 | Akavaram |
| 2016/0127664 A1 | 5/2016 | Bruder |
| 2016/0139244 A1 | 5/2016 | Holtman |
| 2016/0144857 A1 | 5/2016 | Ohshima |
| 2016/0152263 A1 | 6/2016 | Singh |
| 2016/0170494 A1 | 6/2016 | Bonnet |
| 2016/0185389 A1 | 6/2016 | Ishijima |
| 2016/0189435 A1 | 6/2016 | Beaurepaire |
| 2016/0207528 A1 | 7/2016 | Stefan |
| 2016/0224025 A1 | 8/2016 | Petel |
| 2016/0229452 A1 | 8/2016 | Lavoie |
| 2016/0236680 A1 | 8/2016 | Lavoie |
| 2016/0249294 A1 | 8/2016 | Lee |
| 2016/0257304 A1 | 9/2016 | Lavoie |
| 2016/0272244 A1 | 9/2016 | Imai |
| 2016/0282442 A1 | 9/2016 | O'Mahony |
| 2016/0284217 A1 | 9/2016 | Lee |
| 2016/0288657 A1 | 10/2016 | Tokura |
| 2016/0300417 A1 | 10/2016 | Hatton |
| 2016/0304087 A1 | 10/2016 | Noh |
| 2016/0304088 A1 | 10/2016 | Barth |
| 2016/0349362 A1 | 10/2016 | Rohr |
| 2016/0321445 A1 | 11/2016 | Turgeman |
| 2016/0321926 A1 | 11/2016 | Mayer |
| 2016/0334797 A1 | 11/2016 | Ross |
| 2016/0347280 A1 | 12/2016 | Daman |
| 2016/0355125 A1 | 12/2016 | Herbert |
| 2016/0357354 A1 | 12/2016 | Chen |
| 2016/0358474 A1 | 12/2016 | Uppal |
| 2016/0368489 A1 | 12/2016 | Aich |
| 2016/0371607 A1 | 12/2016 | Rosen |
| 2016/0371691 A1 | 12/2016 | Kang |
| 2017/0001650 A1 | 1/2017 | Park |
| 2017/0008563 A1 | 1/2017 | Popken |
| 2017/0026198 A1 | 1/2017 | Ochiai |
| 2017/0028985 A1 | 2/2017 | Kiyokawa |
| 2017/0030722 A1 | 2/2017 | Kojo |
| 2017/0032593 A1 | 2/2017 | Patel |
| 2017/0072947 A1 | 3/2017 | Lavoie |
| 2017/0073004 A1 | 3/2017 | Shepard |
| 2017/0076603 A1 | 3/2017 | Bostick |
| 2017/0097504 A1 | 4/2017 | Takamatsu |
| 2017/0116790 A1 | 4/2017 | Kusens |

(56) References Cited

U.S. PATENT DOCUMENTS

| | | |
|---|---|---|
| 2017/0123423 A1 | 5/2017 | Sako |
| 2017/0129537 A1 | 5/2017 | Kim |
| 2017/0129538 A1 | 5/2017 | Stefan |
| 2017/0132482 A1 | 5/2017 | Kim |
| 2017/0144654 A1 | 5/2017 | Sham |
| 2017/0144656 A1 | 5/2017 | Kim |
| 2017/0147995 A1 | 5/2017 | Kalimi |
| 2017/0168479 A1 | 6/2017 | Dang |
| 2017/0192428 A1 | 7/2017 | Vogt |
| 2017/0200369 A1 | 7/2017 | Miller |
| 2017/0203763 A1 | 7/2017 | Yamada |
| 2017/0208438 A1 | 7/2017 | Dickow |
| 2017/0297385 A1 | 10/2017 | Kim |
| 2017/0297620 A1 | 10/2017 | Lavoie |
| 2017/0301241 A1 | 10/2017 | Urhahne |
| 2017/0308075 A1 | 10/2017 | Whitaker |
| 2017/0336788 A1 | 11/2017 | Iagnemma |
| 2017/0357317 A1 | 12/2017 | Chaudhri |
| 2017/0371514 A1 | 12/2017 | Cullin |
| 2018/0015878 A1 | 1/2018 | McNew |
| 2018/0024559 A1 | 1/2018 | Seo |
| 2018/0029591 A1 | 2/2018 | Lavoie |
| 2018/0029641 A1 | 2/2018 | Solar |
| 2018/0039264 A1 | 2/2018 | Messner |
| 2018/0043884 A1 | 2/2018 | Johnson |
| 2018/0043905 A1* | 2/2018 | Kim ............... B60W 50/10 |
| 2018/0056939 A1 | 3/2018 | van Roermund |
| 2018/0056989 A1 | 3/2018 | Donald |
| 2018/0082588 A1 | 3/2018 | Hoffman, Jr. |
| 2018/0088330 A1 | 3/2018 | Giannuzzi |
| 2018/0093663 A1 | 4/2018 | Kim |
| 2018/0105165 A1 | 4/2018 | Alarcon |
| 2018/0105167 A1 | 4/2018 | Kim |
| 2018/0121008 A1* | 5/2018 | Teoh ............... G06F 1/1632 |
| 2018/0148094 A1 | 5/2018 | Mukaiyama |
| 2018/0174460 A1 | 6/2018 | Jung |
| 2018/0189971 A1 | 7/2018 | Hildreth |
| 2018/0194344 A1 | 7/2018 | Wang |
| 2018/0196963 A1 | 7/2018 | Bandiwdekar |
| 2018/0224863 A1 | 8/2018 | Fu |
| 2018/0236957 A1 | 8/2018 | Min |
| 2018/0284802 A1 | 10/2018 | Tsai |
| 2018/0286072 A1 | 10/2018 | Tsai |
| 2018/0339654 A1 | 11/2018 | Kim |
| 2018/0345851 A1 | 12/2018 | Lavoie |
| 2018/0364731 A1 | 12/2018 | Liu |
| 2019/0005445 A1 | 1/2019 | Bahrainwala |
| 2019/0042003 A1 | 2/2019 | Parazynski |
| 2019/0066503 A1 | 2/2019 | Li |
| 2019/0103027 A1 | 4/2019 | Wheeler |
| 2019/0137990 A1 | 5/2019 | Golgiri |

FOREIGN PATENT DOCUMENTS

| | | |
|---|---|---|
| CN | 104183153 A | 12/2014 |
| CN | 104485013 A | 4/2015 |
| CN | 104691544 A | 6/2015 |
| CN | 103049159 B | 7/2015 |
| CN | 105513412 A | 4/2016 |
| CN | 105588563 A | 5/2016 |
| CN | 105599703 A | 5/2016 |
| CN | 105774691 A | 7/2016 |
| CN | 106027749 A | 10/2016 |
| CN | 205719000 U | 11/2016 |
| CN | 106598630 A | 4/2017 |
| CN | 106782572 A | 5/2017 |
| CN | 106945662 A | 7/2017 |
| CN | 104290751 B | 1/2018 |
| DE | 3844340 A1 | 7/1990 |
| DE | 19817142 A1 | 10/1999 |
| DE | 19821163 A1 | 11/1999 |
| DE | 102005006966 A1 | 9/2005 |
| DE | 102006058213 A1 | 7/2008 |
| DE | 102009024083 A1 | 7/2010 |
| DE | 102016224529 A1 | 3/2011 |
| DE | 102016226008 A1 | 3/2011 |
| DE | 102010034129 B4 | 11/2012 |
| DE | 102012008858 A1 | 11/2012 |
| DE | 102009060169 A1 | 6/2013 |
| DE | 102011080148 A1 | 7/2013 |
| DE | 102012200725 A1 | 9/2013 |
| DE | 102013004214 A1 | 9/2013 |
| DE | 102009051055 A1 | 10/2013 |
| DE | 102011122421 A1 | 6/2014 |
| DE | 102013016342 A1 | 1/2015 |
| DE | 102013019904 A1 | 2/2015 |
| DE | 102012215218 A1 | 4/2015 |
| DE | 102012222972 A1 | 5/2015 |
| DE | 102013019771 A1 | 12/2015 |
| DE | 102013213064 A1 | 2/2016 |
| DE | 102014007915 A1 | 2/2016 |
| DE | 102014011802 A1 | 2/2016 |
| DE | 102014009077 A1 | 4/2016 |
| DE | 102014226458 A1 | 6/2016 |
| DE | 102014011864 A1 | 12/2016 |
| DE | 102014015655 A1 | 5/2017 |
| DE | 102014111570 A1 | 6/2017 |
| DE | 102016214433 A1 | 6/2017 |
| DE | 102015209976 A1 | 7/2017 |
| DE | 102015221224 A1 | 12/2017 |
| DE | 102016211021 A1 | 12/2017 |
| DE | 102016011916 A1 | 2/2018 |
| DE | 102016125282 A1 | 6/2018 |
| EP | 2653367 A1 | 6/2000 |
| EP | 2768718 B1 | 6/2011 |
| EP | 2289768 A2 | 10/2013 |
| EP | 2620351 B1 | 12/2015 |
| EP | 2295281 A1 | 3/2016 |
| EP | 2135788 B1 | 6/2016 |
| FR | 3021798 A1 | 12/2012 |
| GB | 2534471 A | 10/2000 |
| GB | 2344481 A | 12/2012 |
| GB | 2497836 A | 9/2014 |
| GB | 2481324 A | 3/2015 |
| GB | 2517835 A | 5/2016 |
| GB | 2491720 A | 7/2016 |
| JP | 5586450 B2 | 5/2004 |
| JP | 5918683 B2 | 10/2004 |
| JP | 2004333464 | * 11/2004 |
| JP | 2000293797 A | 7/2005 |
| JP | 2004142543 A | 4/2009 |
| JP | 2016119032 A | 4/2009 |
| JP | 2018052188 A | 1/2010 |
| JP | 2004287884 A | 7/2014 |
| JP | 2005193742 A | 7/2014 |
| JP | 2014141216 | * 8/2014 |
| JP | 2009090850 A | 6/2016 |
| JP | 2014134082 A | 7/2016 |
| JP | 2014125196 A | 4/2018 |
| KR | 20130106005 A | 6/2006 |
| KR | 20160039460 A | 5/2008 |
| KR | 20160051993 A | 1/2010 |
| KR | 101641267 B | 9/2013 |
| KR | 20090040024 A | 4/2016 |
| KR | 20100006714 A | 5/2016 |
| WO | WO 2017/112444 A1 | 12/2010 |
| WO | WO 2017/118510 A1 | 6/2011 |
| WO | WO 2006/064544 A1 | 11/2011 |
| WO | WO 2017/125514 A1 | 1/2013 |
| WO | WO 2008/055567 A1 | 4/2013 |
| WO | WO 2010/006981 A1 | 8/2013 |
| WO | WO 2011/141096 A1 | 7/2014 |
| WO | WO 2013/056959 A1 | 5/2015 |
| WO | WO 2013/123813 A1 | 12/2015 |
| WO | WO 2014/103492 A1 | 3/2016 |
| WO | WO 2015/068032 A1 | 8/2016 |
| WO | WO 2015/193058 A1 | 9/2016 |
| WO | WO 2016/046269 A1 | 4/2017 |
| WO | WO 2016/128200 A1 | 5/2017 |
| WO | WO 2016/134822 A1 | 6/2017 |
| WO | WO 2017/062448 A1 | 6/2017 |
| WO | WO 2017/073159 A1 | 6/2017 |

(56) References Cited

FOREIGN PATENT DOCUMENTS

| WO | WO 2017/096307 A1 | 6/2017 |
| WO | WO 2017/096728 A1 | 7/2017 |
| WO | WO 2017/097942 A1 | 7/2017 |

OTHER PUBLICATIONS

Machine translation for JP2014141216, "parking support device and parking support method", Kasai Hajime, Aug. 7, 2014.*
Machine translation for JP2004333464, "simplified method and system for car navigation", Chin Kunie, Nov. 25, 2004.*
Alberto Broggi and Elena Cardarelli, Vehicle Detection for Autonomous Parking Using a Soft-Cascade ADA Boost Classifier, Jun. 8, 2014.
Al-Sherbaz, Ali et al., Hybridisation of GNSS with other wireless/sensors technologies on board smartphones to offer seamless outdoors-indoors positioning for LBS applications, Apr. 2016, 3 pages.
Automatically Into the Parking Space—https://www.mercedes-benz.com/en/mercedes-benz/next/automation/automatically-into-the-parking-space/; Oct. 27, 2014.
Bill Howard, Bosch's View of the Future Car: Truly Keyless Entry, Haptic Feedback, Smart Parking, Cybersecurity, Jan. 9, 2017, 8 Pages.
ChargeItSpot Locations, Find a Phone Charging Station Near You, retrieved at https://chargeitspot.com/locations/ on Nov. 28, 2017.
Core System Requirements Specification (SyRS), Jun. 30, 2011, Research and Innovative Technology Administration.
Daimler AG, Remote Parking Pilot, Mar. 2016 (3 Pages).
Jingbin Liu, IParking: An Intelligent Indoor Location-Based Smartphone Parking Service, Oct. 31, 2012, 15 pages.
Land Rover develops a smartphone remote control for its SUVs, James Vincent, Jun. 18, 2015.
Land Rover, Land Rover Remote Control via Iphone RC Range Rover Sport Showcase—Autogefühl, Retrieved from https://www.youtube.com/watch?v=4ZaaYNaEFio (at 43 seconds and 1 minute 42 seconds), Sep. 16, 2015.
Perpendicular Parking—https://prezi.com/toqmfyxriksl/perpendicular-parking/.
SafeCharge, Secure Cell Phone Charging Stations & Lockers, retrieved at https://www.thesafecharge.com on Nov. 28, 2017.
Search Report dated Jan. 19, 2018 for GB Patent Application No. 1711988.4 (3 pages).
Search Report dated Jul. 11, 2017 for GB Patent Application No. 1700447.4 (3 Pages).
Search Report dated May 21, 2018 for Great Britain Patent Application No. GB 1800277.4 (5 Pages).
Search Report dated Nov. 22, 2018 for GB Patent Application No. GB 1809829.3 (6 pages).
Search Report dated Nov. 27, 2018 for GB Patent Application No. GB 1809112.4 (3 pages).
Search Report dated Nov. 28, 2017, for GB Patent Application No. GB 1710916.6 (4 Pages).
Search Report dated Nov. 28, 2018 for GB Patent Application No. GB 1809842.6 (5 pages).
Search Report dated Oct. 10, 2018 for GB Patent Application No. 1806499.8 (4 pages).
Tesla Model S Owner's Manual v2018.44. Oct. 29, 2018.
Vehicle's Orientation Measurement Method by Single-Camera Image Using Known-Shaped Planar Object, Nozomu Araki, Takao Sato, Yasuo Konishi and Hiroyuki Ishigaki, 2010.

* cited by examiner

USER INTERFACES FOR VEHICLE REMOTE PARK ASSIST

TECHNICAL FIELD

The present disclosure generally relates to park-assist and, more specifically, to user interfaces for vehicle remote park-assist.

BACKGROUND

Many vehicles include motive functions that are at least partially autonomously controlled by the vehicle. For instance, some vehicles include cruise control in which the vehicle controls acceleration and/or deceleration of the vehicle so that a speed of the vehicle is maintained. Further, some vehicles include park-assist features in which the vehicle autonomously controls motive functions of the vehicle to park the vehicle into a parking spot. In some instances, the park-assist features are remote park-assist features that enable a user to initiate the autonomous motive functions remotely via a mobile device.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for user interfaces for vehicle remote park-assist. An example disclosed remote park-assist system includes a mobile device. The mobile device includes a touchscreen to present an interface. The interface includes a pushbutton for receiving a continuous stationary input and an input pad for receiving a dynamic input sequence. The example disclosed remote park-assist system also includes a vehicle. The vehicle includes a communication module for wireless communication with the mobile device and an autonomy unit to perform motive functions while the interface simultaneously receives the continuous stationary input and the dynamic input sequence.

An example disclosed remote park-assist system includes a mobile app. The mobile app includes an interface for a touchscreen of a mobile device. The interface includes a pushbutton for receiving a continuous stationary input and an input pad for receiving a dynamic input sequence. The example disclosed remote park-assist system also includes a communication module for communication with the mobile device and an autonomy unit to perform motive functions while the interface simultaneously receives the continuous stationary input and the dynamic input sequence.

An example disclosed method includes receiving, via a touchscreen of a mobile device, a continuous stationary input via a pushbutton of an interface and a dynamic input sequence via an input pad of the interface. The example disclosed method also includes communicating, via the mobile device, an initiation signal while simultaneously receiving the continuous stationary input and the dynamic input sequence and performing, via an autonomy unit of a vehicle, motive functions for remote park-assist while the vehicle receives the initiation signal.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Many vehicles include motive functions that are at least partially autonomously controlled by the vehicle. Some vehicles include cruise control in which the vehicle controls acceleration and/or deceleration of the vehicle so that a speed of the vehicle is maintained. Further, some vehicles include park-assist features in which the vehicle autonomously controls motive functions of the vehicle to park the vehicle into a parking spot. Some park-assist features are remote park-assist features that enable a user to initiate the autonomous motive functions remotely via a mobile device. Further, some remote park-assist systems initiate the autonomous motive functions of the vehicle when an input is provided to the mobile device. In some instances, the mobile device may receive an unintended input (e.g., due to a slip of the finger of a user, an object touching the mobile device while the mobile device is in a bag or pocket, etc.), thereby potentially causing the vehicle to perform undesired autonomous motive functions for the remote park-assist system.

Example methods and apparatus disclosed herein include a mobile app for a remote park-assist system that is configured to ensure that input(s) received to initiate autonomous motive functions of a vehicle is intended by a user. In examples disclosed herein, the mobile app operates on a mobile device of an operator (e.g., a driver) of the vehicle. The mobile device sends an initiation signal to the vehicle upon and/or while receiving multiple predefined inputs from the operator via a touchscreen of the user. An interface of the mobile app is configured to receive the predefined inputs to ensure that the operator intends to initiate the autonomous motive functions of the vehicle. In some examples, the mobile device is configured to send the initiation signal while the interface of the mobile app simultaneously receives a continuous stationary input (e.g., a continuous pressing of a digital pushbutton) and a dynamic input sequence (e.g., a tapping of a digital pushbutton at a predefined frequency, a continuous motion along a track) from the operator. In some examples, the mobile device is configured to send the initiation signal while the interface of the mobile app simultaneously receives a plurality of continuous stationary inputs (e.g., continuous pressing of digital pushbuttons). Further, in some examples, the mobile device is configured to send the initiation signal while the interface of the mobile app receives a continuous stationary input (e.g., a continuous pressing of a digital pushbutton) after a dynamic input sequence (e.g., an uninterrupted motion along a predefined path) is received.

As used herein, "remote parking," "vehicle remote park-assist," "remote park-assist," and "RePA" refer to a system in which a vehicle controls its motive functions, without direct steering or velocity input from an operator (e.g., a driver), to autonomously park within a parking spot while the operator is located outside of the vehicle. For example, an autonomy unit of a remote park-assist system controls the motive functions of the vehicle upon receiving a remote initiation signal from a mobile device (e.g., a smart phone, a key fob, a wearable, a smart watch, a tablet, etc.) of the operator.

Figure 1:
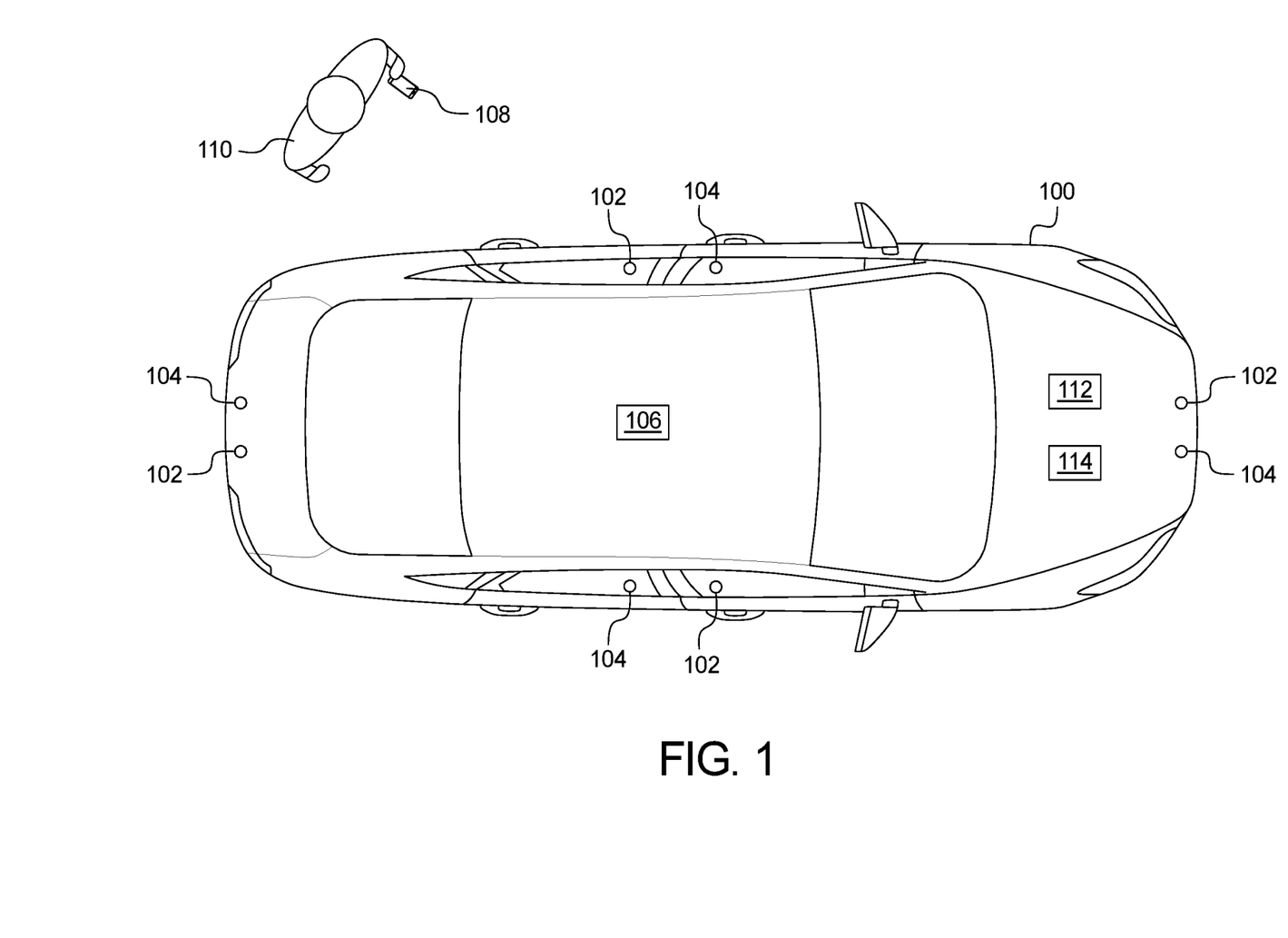
FIG. 1 illustrates an example vehicle and an example mobile device in accordance with the teachings herein.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be semi-autonomous (e.g., some routine motive functions controlled by the vehicle 100) or autonomous (e.g., motive functions are controlled by the vehicle 100 without direct driver input).

As illustrated in FIG. 1, the vehicle 100 includes range-detection sensors. As used herein, a "range-detection sensor" refers to an electronic device that is configured to collect information to detect a presence of and distance to nearby object(s). In the illustrated example, the range-detection sensors of the vehicle 100 include proximity sensors 102 and cameras 104. The proximity sensors 102 are configured to detect the presence, proximity, and/or location of object(s) near the vehicle 100. For example, the proximity sensors 102 include radar sensor(s), lidar sensor(s), ultrasonic sensor(s), and/or any other sensor configured to detect the presence, proximity, and/or location of nearby object(s). A radar sensor detects and locates an object via radio waves, a lidar sensor detects and locates the object via lasers, and an ultrasonic sensor detects and locates the object via ultrasound waves. Further, the cameras 104 capture image(s) and/or video of a surrounding area of the vehicle 100 to enable nearby object(s) to be identified and located. In the illustrated example, the range-detection sensors (e.g., the proximity sensors 102, the cameras 104) are located on each side of the vehicle 100 (e.g., front, rear, left, right) to enable the range-detection sensors in monitoring each portion of the surrounding area of the vehicle 100.

The vehicle 100 also includes a communication module 106 that is configured to include network interface(s) configured for wireless communication with a mobile device 108 (e.g., a smart phone, a wearable, a smart watch, a tablet, etc.) of a user 110 of the vehicle 100 via short-range wireless communication protocol(s). In some examples, the communication module 106 implements the Bluetooth® and/or Bluetooth® Low Energy (BLE) protocols. The Bluetooth® and BLE protocols are set forth in Volume 6 of the Bluetooth® Specification 4.0 (and subsequent revisions) maintained by the Bluetooth® Special Interest Group. Additionally or alternatively, the communication module 106 is configured to wirelessly communicate via Wi-Fi®, Near Field Communication (NFC), ultra-wide band (UWB) communication, ultra-high frequency (UHF) communication, low frequency (LF) communication, and/or any other communication protocol that enables the communication module 106 to communicatively couple to the mobile device 108.

Further, in some examples, the communication module 106 includes network interface(s) for communication with external network(s). The external network(s) may be a public network, such as the Internet; a private network, such as an intranet; or combinations thereof. The communication module 106 may utilize a variety of networking protocols now available or later developed including, but not limited to, TCP/IP-based networking protocols. For example, the communication module 106 includes one or more communication controllers for cellular networks, such as Global System for Mobile Communications (GSM), Universal Mobile Telecommunications System (UMTS), Long Term Evolution (LTE), Code Division Multiple Access (CDMA).

The vehicle 100 of the illustrated example also includes an autonomy unit 112. For example, the autonomy unit 112 is an electronic control unit (e.g., one of a plurality of electronic control units 806 of FIG. 8). The autonomy unit 112 is configured to control performance of autonomous and/or semi-autonomous driving maneuvers of the vehicle 100 based upon, at least in part, data collected by the proximity sensors 102, the cameras 104, and/or other range-detection sensors of the vehicle 100. That is, the autonomy unit 112 determines the autonomous motive function(s) to perform for a remote park-assist system based on data collected by the range-detection sensors. Further, the autonomy unit 112 is configured to perform motive functions for the park-assist system (e.g., a remote park-assist system) upon receiving an initiation signal from a park-assist controller 114 of the vehicle 100. In the illustrated example, the park-assist controller 114 is configured to initiate operation of the autonomy unit 112 based on signal(s) received by the communication module 106 from the mobile device 108.

In operation, the mobile device 108 presents an interface (e.g., an interface 202 of FIG. 2, an interface 302 of FIG. , an interface 402 of FIG. 4, an interface 502, of FIG. 5, an interface 602 of FIG. 6) of a mobile app (e.g., an app 708 of FIG. 7) for the remote park-assist system via a touchscreen (e.g., a touchscreen 200 of FIGS. 2-7). Further, the mobile device 108 sends an initiation signal to the communication module 106 of the vehicle 100 while the interface of the mobile app receives a predefined combination of inputs from the user 110 via the touchscreen. In some examples, the mobile device 108 sends the initiation signal while the interface simultaneously receives a continuous stationary input (e.g., a continuous pressing of a digital pushbutton) and a dynamic input sequence (e.g., a tapping of a digital pushbutton at a predefined frequency, a continuous motion along a track). In some examples, the mobile device 108 sends the initiation signal while the interface simultaneously receives a plurality of continuous stationary inputs (e.g., continuous pressing of digital pushbuttons). In some examples, the mobile device 108 sends the initiation signal while the interface receives a continuous stationary input (e.g., a continuous pressing of a digital pushbutton) after a dynamic input sequence (e.g., an uninterrupted motion along a predefined path) is received.

While the communication module 106 receives the initiation signal from the mobile device 108, the park-assist controller 114 instructs the autonomy unit 112 to perform the autonomous motive functions for remote park-assist. Further, when the communication module 106 stops receiving the initiation signal from the mobile device 108, the park-assist controller 114 instructs the autonomy unit 112 to stop performing the autonomous motive functions for remote park-assist.

In some examples, the park-assist controller 114 instructs the autonomy unit 112 to perform the autonomous motive functions for remote park-assist in response to (1) the communication module 106 receiving the initiation signal from the mobile device 108 and (2) the park-assist controller 114 determining that the mobile device 108 is within a predetermined distance of the vehicle 100. That is, the autonomy unit 112 is configured to (1) perform remote park-assist when the mobile device 108 is within a tethering range of the vehicle 100 and (2) not perform remote park-assist when the mobile device 108 is beyond the tethering range of the vehicle 100. For instance, some governmental agencies have instituted regulations that require a user (e.g., the user 110) be within a tethering range of a vehicle (e.g., the vehicle 100) while the vehicle autonomously performs remote park-assist motive functions. In some examples, the tethering range is defined to extend to a predetermined distance (e.g., 6 meters) from an exterior surface of the vehicle 100. In the illustrated example, the park-assist controller 114 and/or the communication module 106 is configured to determine a distance between the mobile device 108 and the exterior surface of the vehicle 100 based on a distance characteristic of the initiation signal and/or other wireless communication between the mobile device 108 and the communication module 106 of the vehicle 100. For example, the park-assist controller 114 and/or the communication module 106 determines the distance to the mobile device 108 based upon received signal strength indicators (RSSIs), time-of-flight, angle-of-arrival, and/or other distance characteristics of communication between the mobile device 108 and the communication module 106.

FIGS. 2-6 illustrated the mobile device 108 of the user 110. More specifically, FIGS. 2-6 depict example remote park-assist interfaces of a mobile app (e.g., an app 708 of FIG. 7) that are presented via a touchscreen 200 of the mobile device 108 to initiate performance of park-assist driving maneuvers. That is, the mobile device 108 includes the touchscreen 200 that is configured to present interface(s), and the mobile app includes interface(s) for the touchscreen 200 of the mobile device 108.

Figure 2:
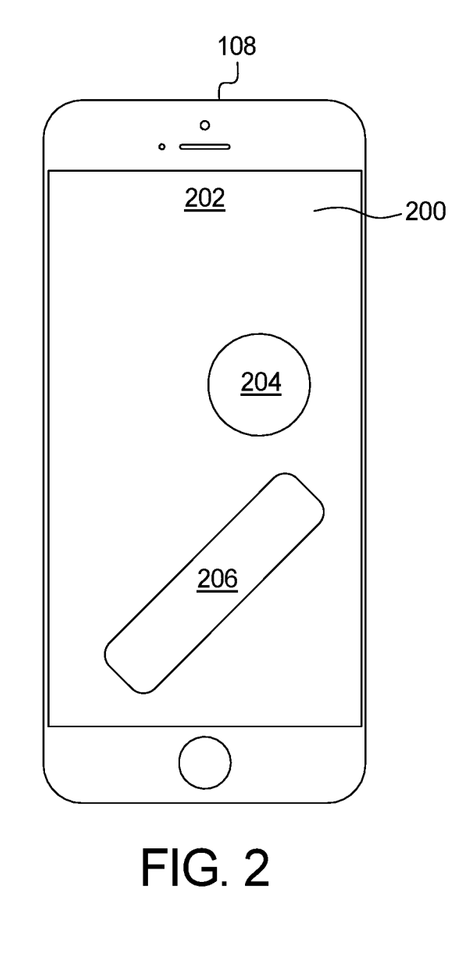
FIG. 2 depicts an example remote park-assist interface of the mobile device of FIG. 1.

FIG. 2 depicts an example interface 202 of the mobile app for the remote park-assist system. In the illustrated example, the interface 202 includes (1) a pushbutton 204 that is configured for receiving a continuous stationary input and (2) an input pad 206 that is configured for receiving a dynamic input sequence. In the illustrated example, the input pad 206 is a track along which the user 110 is to drag his or her finger and/or a stylus in a continuous motion. Further, the interface 202 of the illustrated example is configured to enable the user 110 to simultaneously provide a continuous stationary input and a dynamic input sequence. For example, the user 110 provides a continuous stationary input with one finger and provides a dynamic input sequence with another finger.

As used herein, a "continuous stationary input" refers to an input that is configured to be received at one location of a touchscreen interface (e.g., a pushbutton location) in an uninterrupted manner over a period of time. In the illustrated example, the interface 202 of the mobile app receives a continuous stationary input when the user 110 continuously presses a portion (e.g., one or more pixels) of the touchscreen 200 that aligns with the pushbutton 204 of the interface 202. That is, a continuous stationary input includes a continuous pressing of the pushbutton 204 by the user 110. As used herein, a "dynamic input sequence" refers to a predefined non-continuous and/or non-stationary input that is configured to be received by a touchscreen interface over a period of time. In the illustrated example, the interface 202 of the mobile app receives a dynamic input sequence when the user 110 continuously drags his or her finger and/or a stylus in a continuous sliding motion along the input pad 206. That is, a dynamic input sequence includes a continuous back-and-forth sliding motion along the input pad 206.

In operation, the mobile device 108 sends an initiation signal to the communication module 106 of the vehicle 100 while the interface simultaneously receives (1) the continuous stationary input via the pushbutton 204 and (2) the dynamic input sequence via the input pad 206. While the communication module 106 receives the initiation signal, the park-assist controller 114 instructs the autonomy unit 112 to perform autonomous driving maneuver(s) for remote park-assist. That is, the autonomy unit 112 autonomously perform motive function(s) of the vehicle 100 for remote park-assist while the interface 202 of the mobile app simultaneously receives the continuous stationary input and the dynamic input sequence.

In some examples, the autonomy unit 112 causes the vehicle 100 to travel at a speed that corresponds with a speed of the dynamic input sequence along the input pad 206. For example, the autonomy unit 112 increases the vehicle speed as the user 110 increases the speed at which the user 110 slides his or her finger and/or a stylus back-and-forth along the input pad 206. Further, the autonomy unit 112 decreases the vehicle speed as the user 110 decreases the speed at which the user 110 slides his or her finger and/or a stylus back-and-forth along the input pad 206.

Further, the mobile device 108 does not send an initiation signal to the communication module 106 of the vehicle 100 when the interface 202 does not receive (1) the continuous stationary input via the pushbutton 204 and/or (2) the dynamic input sequence via the input pad 206. For example, the interface 202 stops receiving the continuous stationary input when the user 110 stops pressing a portion (e.g., one or more pixels) of the touchscreen 200 that aligns with the pushbutton 204. Further, the interface 202 stops receiving the dynamic input sequence when the user 110 stops dragging his or her finger and/or a stylus back-and-forth along the input pad 206 in a continuous sliding motion. When the communication module 106 does not receive the initiation signal, the park-assist controller 114 instructs the autonomy unit 112 to stop performing autonomous driving maneuver(s) for remote park-assist. In turn, the autonomy unit 112 stops the vehicle 100 from moving. That is, the autonomy unit 112 stops performing motive function(s) of the vehicle 100 for remote park-assist when the interface 202 of the mobile app does not receive the continuous stationary input and/or the dynamic input sequence.

In some examples, the mobile app utilizes a timer when determining whether the user 110 has stopped providing the dynamic input sequence to account for indecisiveness of the user 110 and/or unfamiliarity with the remote park-assist system. For instance, some users potentially may have a tendency to pause slightly right before changing directions of the sliding motion along the input pad 206. To prevent such pauses from unintentionally stopping the performance of the autonomous motive function(s), the interface 202 compares a pause in motion to a predetermined period-of-time. If the pause occurs for less than a predetermined period-of-time, the interface 202 does not detect that the dynamic input sequence has stopped. In contrast, if the pause equals or exceeds the predetermined period-of-time, the interface 202 detects that the dynamic input sequence has stopped. In some examples, the predetermined period-of-time varies based on a location of the pause within the input pad 206. For example, in response to detecting any pause of the continuous sliding motion at a center portion of the input pad 206, the interface 202 of the mobile app detects that the dynamic input sequence has stopped. Further, the mobile app incorporates the timer if the pause occurs toward and/or at an end of the input pad 206. That is, the mobile app determines that the interface has stopped receiving the dynamic input sequence in response to detecting a pause in the continuous sliding motion that (1) occurs toward and/or at an end of the input pad 206 and (2) extends beyond a predetermined period-of-time.

Figure 3:
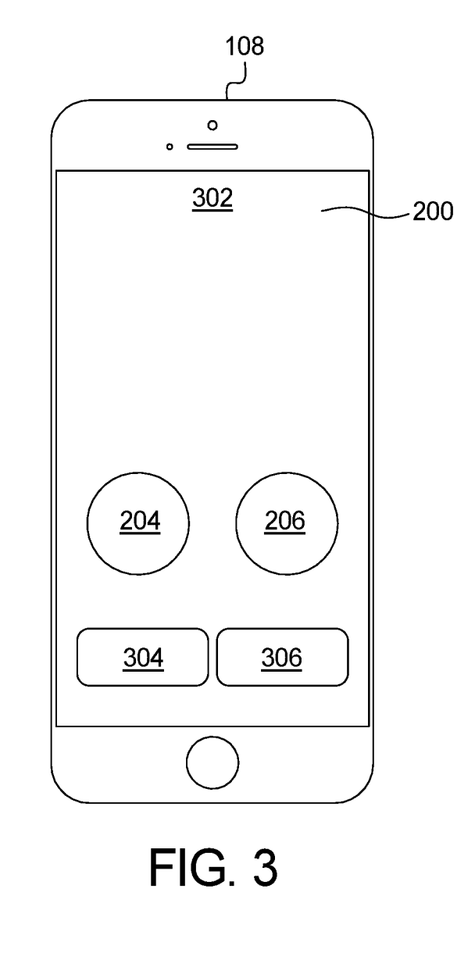
FIG. 3 depicts another example remote park-assist interface of the mobile device of FIG. 1.

FIG. 3 depicts another example interface 302 of the mobile app for the remote park-assist system. In the illustrated example, the interface 302 includes (1) the pushbutton 204 (e.g., a first pushbutton) that is configured for receiving a continuous stationary input and (2) the input pad 206 that is configured for receiving a dynamic input sequence. In the illustrated example, the input pad 206 is a pushbutton (e.g., a second pushbutton) that the user 110 is to tap at predefined intervals. Further, the interface 302 of the illustrated example is configured to enable the user 110 to simultaneously provide a continuous stationary input and a dynamic input sequence. For example, the user 110 provides a continuous stationary input with one finger and provides a dynamic input sequence with another finger.

In the illustrated example, the interface 302 of the mobile app receives a continuous stationary input when the user 110 continuously presses a portion (e.g., one or more pixels) of the touchscreen 200 that aligns with the pushbutton 204 of the interface 302. That is, a continuous stationary input includes a continuous pressing of the pushbutton 204 by the user 110. Further, in the illustrated example, the interface 302 of the mobile app receives a dynamic input sequence when the user 110 taps the input pad 206 at a predefined frequency. That is, a dynamic input sequence includes a tapping of the input pad 206 at a predefined frequency.

The interface 302 of the illustrated example also includes a frequency button 304 and a metronome button 306. For example, the frequency button 304 is configured to enable the user 110 to adjust the frequency at which the user 110 is to tap the input pad 206. That is, the user 110 is to press a portion (e.g., one or more pixels) of the touchscreen 200 that aligns with the frequency button 304 to adjust the tapping frequency. Further, the metronome button 306 is configured to initiate an audio and/or visual metronome that aligns with the tapping frequency to facilitate the user 110 in tapping the input pad 206 at the tapping frequency.

In operation, the mobile device 108 sends an initiation signal to the communication module 106 of the vehicle 100 while the interface simultaneously receives (1) the continuous stationary input via the pushbutton 204 and (2) the dynamic input sequence via the input pad 206. While the communication module 106 receives the initiation signal, the park-assist controller 114 instructs the autonomy unit 112 to perform autonomous driving maneuver(s) for remote park-assist. That is, the autonomy unit 112 autonomously perform motive function(s) of the vehicle 100 for remote park-assist while the interface 302 of the mobile app simultaneously receives the continuous stationary input and the dynamic input sequence.

Further, the mobile device 108 does not send an initiation signal to the communication module 106 of the vehicle 100 when the interface 302 does not receive (1) the continuous stationary input via the pushbutton 204 and/or (2) the dynamic input sequence via the input pad 206. For example, the interface 302 stops receiving the continuous stationary input when the user 110 stops pressing a portion (e.g., one or more pixels) of the touchscreen 200 that aligns with the pushbutton 204. Further, the interface 302 stops receiving the dynamic input sequence when the user 110 stops tapping the input pad 206 at the predefined frequency. When the communication module 106 does not receive the initiation signal, the park-assist controller 114 instructs the autonomy unit 112 to stop performing autonomous driving maneuver(s) for remote park-assist. In turn, the autonomy unit 112 stops the vehicle 100 from moving. That is, the autonomy unit 112 stops performing motive function(s) of the vehicle 100 for remote park-assist when the interface 302 of the mobile app does not receive the continuous stationary input and/or the dynamic input sequence.

Figure 4:
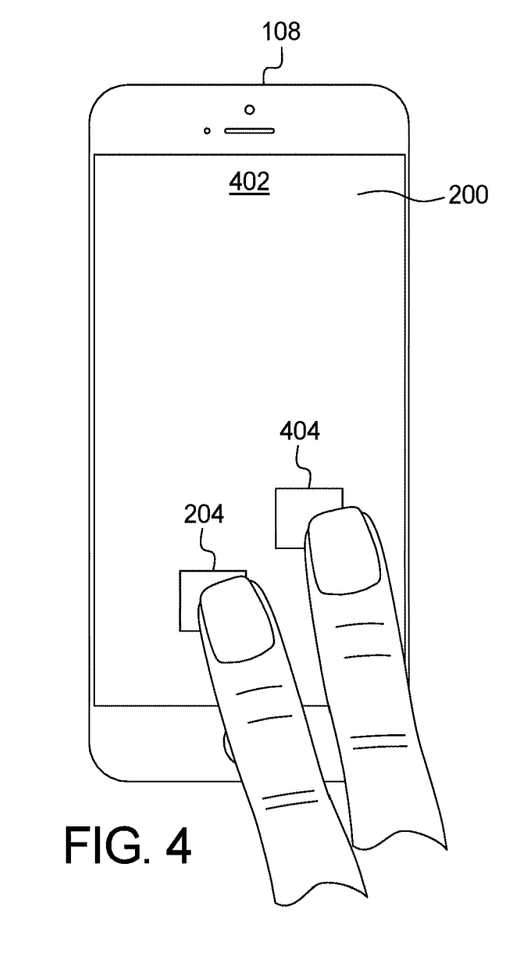
FIG. 4 depicts another example remote park-assist interface of the mobile device of FIG. 1.

FIG. 4 depicts another example interface 402 of the mobile app for the remote park-assist system. As illustrated in FIG. 4, the interface 402 includes the pushbutton 204 and another pushbutton 404. The pushbutton 204 (e.g., a first pushbutton) is configured for receiving a first continuous stationary input. For example, the interface 402 of the mobile app receives the first continuous stationary input when the user 110 continuously presses a portion (e.g., one or more pixels) of the touchscreen 200 that aligns with the pushbutton 204 of the interface 402. Further, the pushbutton 404 (e.g., a second pushbutton) is configured for receiving a second continuous stationary input. For example, the interface 402 of the mobile app receives the second continuous stationary input when the user 110 continuously presses a portion (e.g., one or more pixels) of the touchscreen 200 that aligns with the pushbutton 404 of the interface 402. That is, in the illustrated example, a continuous stationary input includes a continuous pressing of the pushbutton 204 and/or the pushbutton 404 by the user 110. Further, the interface 402 of FIG. 4 is configured to enable the user 110 to simultaneously provide the first continuous stationary input and the second continuous stationary input. For example, the user 110 provides a first continuous stationary input with one finger and provides a second continuous stationary input with another finger. In the illustrated example, the pushbutton 204 and the pushbutton 404 are the same shape and size. In other examples, the pushbutton 204 and the pushbutton 404 may have different shapes and/or sizes.

In operation, the mobile device 108 sends an initiation signal to the communication module 106 of the vehicle 100 while the interface simultaneously receives the first and second continuous stationary inputs. While the communication module 106 receives the initiation signal, the park-assist controller 114 instructs the autonomy unit 112 to perform autonomous driving maneuver(s) for remote park-assist. That is, the autonomy unit 112 autonomously performs motive function(s) of the vehicle 100 for remote park-assist while the interface 402 of the mobile app simultaneously receives the first and second continuous stationary inputs. Further, the mobile device 108 does not send an initiation signal to the communication module 106 of the vehicle 100 when the interface 402 does not receive the first continuous stationary input and/or the second continuous stationary input. For example, the interface 402 stops receiving the first continuous stationary input when the user 110 stops pressing a portion (e.g., one or more pixels) of the touchscreen 200 that aligns with the pushbutton 204. Further, the interface 402 stops receiving the second continuous stationary input when the user 110 stops pressing a portion (e.g., one or more pixels) of the touchscreen 200 that aligns with the pushbutton 404. When the communication module 106 does not receive the initiation signal, the park-assist controller 114 instructs the autonomy unit 112 to stop performing autonomous driving maneuver(s) for remote park-assist. In turn, the autonomy unit 112 stops the vehicle 100 from moving. That is, the autonomy unit 112 stops performing motive function(s) of the vehicle 100 for remote park-assist when the interface 402 of the mobile app does not receive the first and/or second continuous stationary input.

In some examples, the mobile app of the mobile device 108 is configured to enable an interface to be user configurable. For example, the interface 402 is user configurable such that the user 110 is able to position the pushbutton 204 and/or the pushbutton 404 at preferred locations on the interface 402. In some examples, the mobile app limits repositioning of pushbutton(s) and/or input pad(s) on an interface. For example, the mobile app prevents the pushbutton 204 and/or the pushbutton 404 from being positioned within a minimum distance of each other and/or an outer edge of the interface 402. Additionally or alternatively, the mobile app of the mobile device 108 is configured to enable the number of pushbutton(s) and/or input pad(s) to be adjusted. For example, the interface 402 may be adjusted by the user 110 to include more pushbuttons (e.g., 3, 4, etc.) that each must be simultaneously pressed to send the initiation signal.

Figure 5:
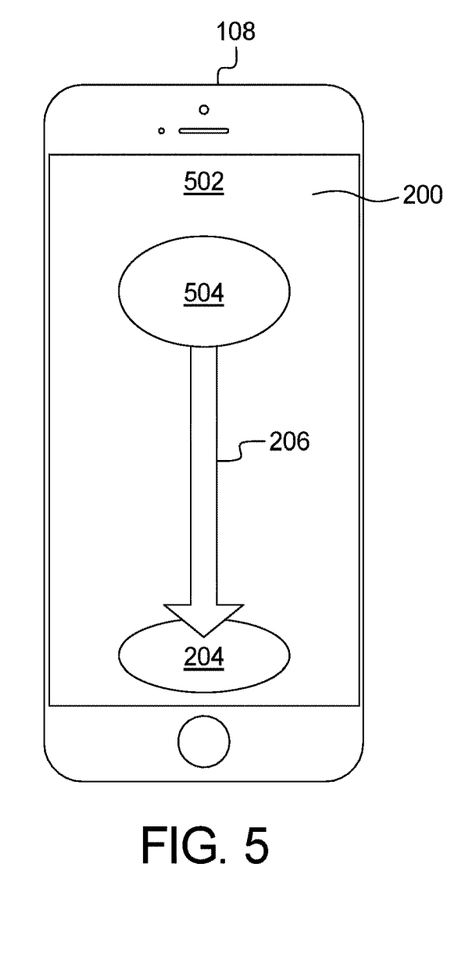
FIG. 5 depicts another example remote park-assist interface of the mobile device of FIG. 1.

FIG. 5 depicts another example interface 502 of the mobile app for the remote park-assist system. As illustrated in FIG. 5, the interface 502 includes the pushbutton 204 (e.g., a first pushbutton), the input pad 206, and another pushbutton 504 (e.g., a second pushbutton). The pushbutton 204 is configured for receiving a continuous stationary input. For example, the interface 502 of the mobile app receives the continuous stationary input when the user 110 continuously presses a portion (e.g., one or more pixels) of the touchscreen 200 that aligns with the pushbutton 204 of the interface 502. Further, the input pad 206 of the illustrated example is a track that is configured for receiving a dynamic input sequence. In the illustrated example, the dynamic input sequence is a sliding motion along a path defined by the input pad 206. As illustrated in FIG. 5, the input pad 206 extends between the pushbutton 504 and the pushbutton 204. Further, the pushbutton 504 is configured to receive an initial input from the user 110.

In operation, the user 110 is to press the pushbutton 504, slide his or her finger and/or a stylus along the input pad 206, and hold the pushbutton 204 in a single motion. The mobile device 108 sends an initiation signal to the communication module 106 of the vehicle 100 while user 110 holds the pushbutton 204 after pressing the pushbutton 504 and sliding along the input pad 206. That is, in the illustrated example, the mobile device 108 is configured to send the initiation signal while the interface receives a continuous stationary input (e.g., holding of the pushbutton 204) after receiving a dynamic input sequence (e.g., pressing of the pushbutton 504 and sliding along the input pad 206) in a continuous motion. While the communication module 106 receives the initiation signal, the park-assist controller 114 instructs the autonomy unit 112 to perform autonomous driving maneuver(s) for remote park-assist. That is, the autonomy unit 112 autonomously perform motive function(s) of the vehicle 100 for remote park-assist while the interface 502 of the mobile app receives the continuous stationary input after receiving the dynamic input sequence in a continuous motion.

Further, the mobile device 108 does not send an initiation signal to the communication module 106 of the vehicle 100 when the interface 402 does not receive the continuous stationary input and/or the dynamic input sequence in a continuous motion. For example, the interface 402 does not receive the continuous stationary input when the user 110 stops pressing a portion (e.g., one or more pixels) of the touchscreen 200 that aligns with the pushbutton 204. Further, the interface 402 does not receive the dynamic input sequence if the user 110 does not drag his or her finger and/or a stylus from the pushbutton 504 to the pushbutton 204 along the input pad 206. When the communication module 106 does not receive the initiation signal, the park-assist controller 114 instructs the autonomy unit 112 to stop performing autonomous driving maneuver(s) for remote park-assist. In turn, the autonomy unit 112 stops the vehicle 100 from moving. To begin resending the initiation signal, the user 110 is to again press the pushbutton 504, slide along the input pad 206, and hold the pushbutton 204.

Figure 6:
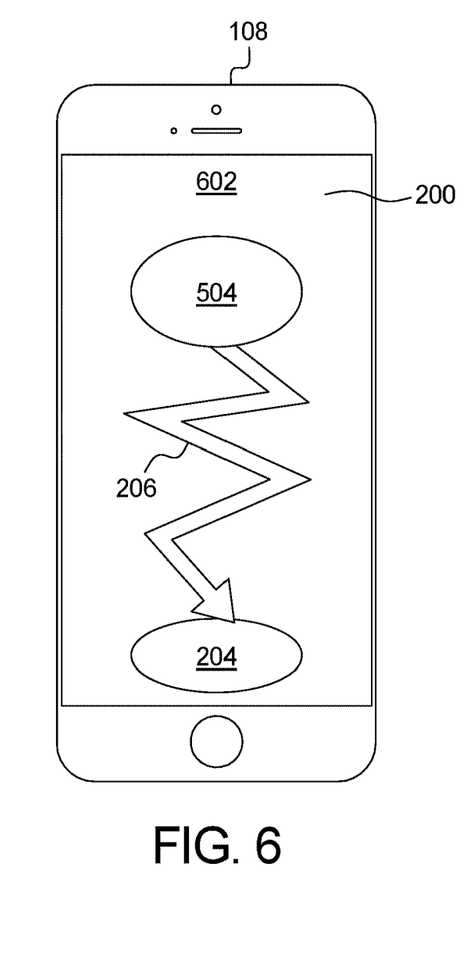
FIG. 6 depicts another example remote park-assist interface of the mobile device of FIG. 1.

FIG. 6 depicts another example interface 602 of the mobile app for the remote park-assist system. As illustrated in FIG. 6, the interface 602 includes the pushbutton 204 (e.g., a first pushbutton), the input pad 206, and the pushbutton 504 (e.g., a second pushbutton). The pushbutton 204 is configured for receiving a continuous stationary input. The input pad 206 is a track that extends between the pushbutton 504 and the pushbutton 204 and is configured for receiving a dynamic input sequence. In the illustrated example, the dynamic input sequence is a sliding motion along a path defined by the input pad 206. Further, in the illustrated example, the track of the input pad 206 includes predefined turn(s), bend(s), and/or other change(s) in direction that the user 110 is to trace to provide the dynamic input sequence. The pushbutton 504 is configured to receive an initial input from the user 110.

In operation, the user 110 is to press the pushbutton 504, slide his or her finger and/or a stylus along the input pad 206, and hold the pushbutton 204 in a single motion. The mobile device 108 sends an initiation signal to the communication module 106 of the vehicle 100 while user 110 holds the pushbutton 204 after pressing the pushbutton 504 and sliding along the input pad 206. That is, in the illustrated example, the mobile device 108 is configured to send the initiation signal while the interface receives a continuous stationary input (e.g., holding of the pushbutton 204) after receiving a dynamic input sequence (e.g., pressing of the pushbutton 504 and sliding along the input pad 206) in a continuous motion. While the communication module 106 receives the initiation signal, the park-assist controller 114 instructs the autonomy unit 112 to perform autonomous driving maneuver(s) for remote park-assist.

Further, the mobile device 108 does not send an initiation signal to the communication module 106 of the vehicle 100 when the interface 402 does not receive the continuous stationary input and/or the dynamic input sequence in a continuous motion. When the communication module 106 does not receive the initiation signal, the park-assist controller 114 instructs the autonomy unit 112 to stop performing autonomous driving maneuver(s) for remote park-assist. To begin resending the initiation signal, the user 110 is to again press the pushbutton 504, slide along the input pad 206, and hold the pushbutton 204.

Figure 7:
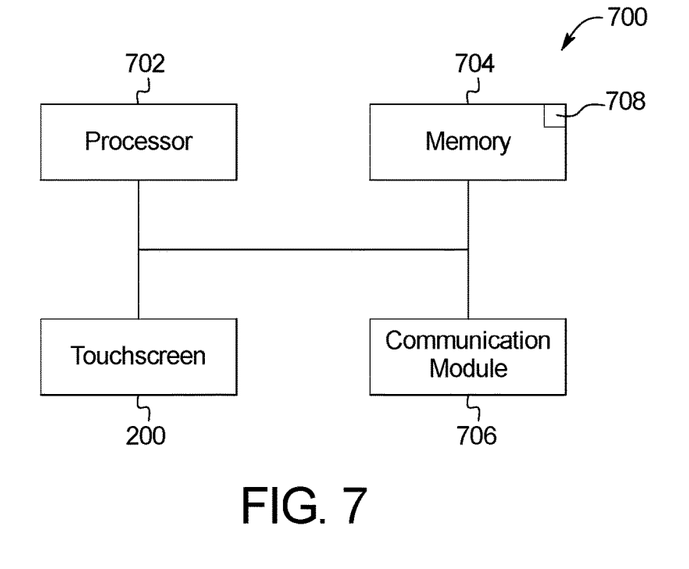
FIG. 7 is a block diagram of electronic components of the mobile device of FIG. 1.

FIG. 7 is a block diagram of electronic components 700 of the mobile device 108. In the illustrated example, the electronic components 700 include a processor 702, memory 704, the touchscreen 200, and a communication module 706.

In the illustrated example, the processor 702 (also referred to as a microcontroller unit and a controller) may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 704 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 704 includes multiple kinds of memory, particularly volatile memory and non-volatile memory.

The memory 704 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 704, the computer readable medium, and/or within the processor 702 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

In the illustrated example, an app 708 (also referred to as mobile app) is a computer program and/or software that is configured to operate on the mobile device 108. The app 708 is stored in the memory 704 and configured to be executed by the processor 702. During operation, the app 708 presents an interface (e.g., the interface 202, the interface 302, the interface 402, the interface 502, the interface 602) to and receives input(s) from the user 110 to enable the user 110 to initiate the remote park-assist system of the vehicle 100.

The touchscreen 200 of the illustrated example provides an interface between the user 110 and the mobile device 108 to enable the user 110 to initiate the remote park-assist system of the vehicle 100. For example, the touchscreen 200 presents an interface (e.g., the interface 202, the interface 302, the interface 402, the interface 502, the interface 602) of the app 708 to the user 110 and receives input from the user 110 that corresponds with the interface. Based on input received from the user 110 via the touchscreen 200, the app 708 determines whether to send an initiation signal to the vehicle 100 to initiate performance of remote park-assist.

The touchscreen 200 is a resistive touchscreen, a capacitive touchscreen, and/or any other type of touchscreen that displays output information to and tactilely receives input information from the user 110 of the mobile device 108. Further, in some examples, the mobile device 108 includes other input devices (e.g., buttons, knobs, microphones, etc.) and/or output devices (e.g., speakers, LEDs, etc.) to respectively receive input information from and/or provide output information to the user 110 of the mobile device 108.

The communication module 706 of the mobile device 108 wirelessly communicates with the communication module 106 of the vehicle 100 to enable the app 708 to initiate motive functions of the vehicle 100 for the remote park-assist system. The communication module 706 includes wireless network interfaces to enable communication with other devices and/or external networks. The external network(s) may be a public network, such as the Internet; a private network, such as an intranet; or combinations thereof, and may utilize a variety of networking protocols now available or later developed including, but not limited to, TCP/IP-based networking protocols. The communication module 706 also includes hardware (e.g., processors, memory, storage, antenna, etc.) and software to control the wireless network interfaces. For example, the communication module 706 includes one or more communication controllers for cellular networks, such as Global System for Mobile Communications (GSM), Universal Mobile Telecommunications System (UMTS), Long Term Evolution (LTE), Code Division Multiple Access (CDMA).

In the illustrated example, the communication module 706 includes a wireless personal area network (WPAN) module that is configured to wirelessly communicate with the communication module 106 of the vehicle 100 via short-range wireless communication protocol(s). In some examples, the communication module 706 implements the Bluetooth® and/or Bluetooth® Low Energy (BLE) protocols. The Bluetooth® and BLE protocols are set forth in Volume 6 of the Bluetooth® Specification 4.0 (and subsequent revisions) maintained by the Bluetooth® Special Interest Group. Additionally or alternatively, the communication module 106 is configured to wirelessly communicate via Wi-Fi®, Near Field Communication (NFC), UWB (Ultra-Wide Band), and/or any other short-range and/or local wireless communication protocol (e.g., IEEE 802.11 a/b/g/n/ac) that enables the communication module 706 to communicatively couple to the communication module 106 of the vehicle 100.

Figure 8:
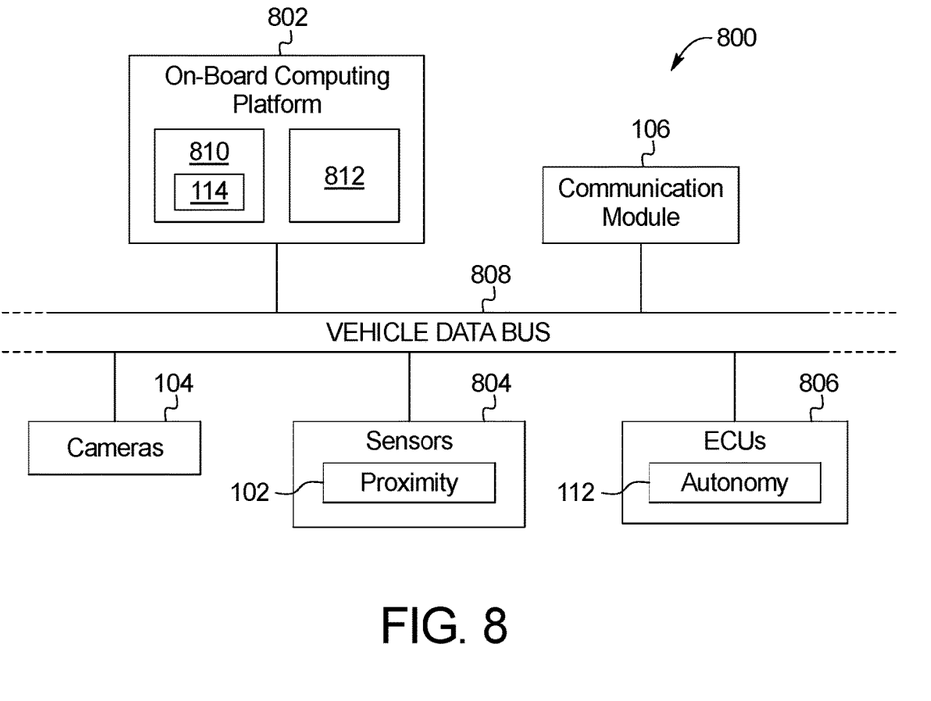
FIG. 8 is a block diagram of electronic components of the vehicle of FIG. 1.

FIG. 8 is a block diagram of electronic components 800 of the vehicle 100. In the illustrated example, the electronic components 800 include an on-board computing platform 802, the communication module 106, the cameras 104, sensors 804, electronic control units (ECUs) 806, and a vehicle data bus 808.

The on-board computing platform 802 includes a processor 810 (also referred to as a microcontroller unit and a controller) and memory 812. In the illustrated example, the processor 810 of the on-board computing platform 802 is structured to include the park-assist controller 114. In other examples, the park-assist controller 114 is incorporated into another ECU with its own processor and memory. The processor 810 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 812 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 812 includes multiple kinds of memory, particularly volatile memory and non-volatile memory.

The memory 812 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 812, the computer readable medium, and/or within the processor 810 during execution of the instructions.

The sensors 804 are arranged in and/or around the vehicle 100 to monitor properties of the vehicle 100 and/or an environment in which the vehicle 100 is located. One or more of the sensors 804 may be mounted to measure properties around an exterior of the vehicle 100. Additionally or alternatively, one or more of the sensors 804 may be mounted inside a cabin of the vehicle 100 or in a body of the vehicle 100 (e.g., an engine compartment, wheel wells, etc.) to measure properties in an interior of the vehicle 100. For example, the sensors 804 include accelerometers, odometers, tachometers, pitch and yaw sensors, wheel speed sensors, microphones, tire pressure sensors, biometric sensors and/or sensors of any other suitable type. In the illustrated example, the sensors 804 include the proximity sensors 102 configured to detect the presence, proximity, and/or location of nearby object(s).

The ECUs 806 monitor and control the subsystems of the vehicle 100. For example, the ECUs 806 are discrete sets of electronics that include their own circuit(s) (e.g., integrated circuits, microprocessors, memory, storage, etc.) and firmware, sensors, actuators, and/or mounting hardware. The ECUs 806 communicate and exchange information via a vehicle data bus (e.g., the vehicle data bus 808). Additionally, the ECUs 806 may communicate properties (e.g., status of the ECUs 806, sensor readings, control state, error and diagnostic codes, etc.) to and/or receive requests from each other. For example, the vehicle 100 may have dozens of the ECUs 806 that are positioned in various locations around the vehicle 100 and are communicatively coupled by the vehicle data bus 808. In the illustrated example, the ECUs 806 include the autonomy unit 112 that is configured to perform autonomous motive functions for remote park-assist.

The vehicle data bus 808 communicatively couples the cameras 104, the communication module 106, the on-board computing platform 802, the sensors 804, and the ECUs 806. In some examples, the vehicle data bus 808 includes one or more data buses. The vehicle data bus 808 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 9:
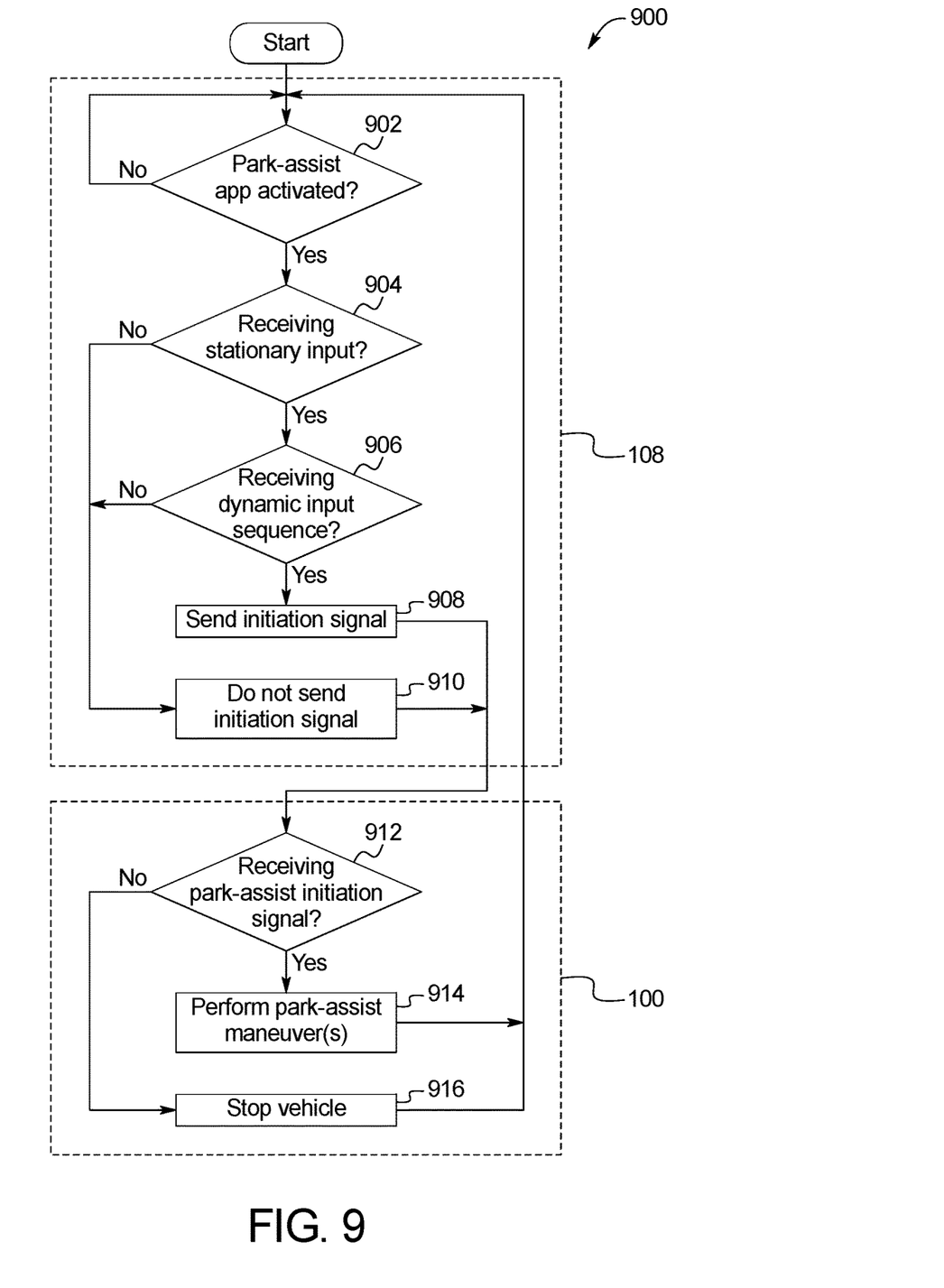
FIG. 9 is a flowchart for initiating remote-park assist via a mobile interface in accordance with the teachings herein.

FIG. 9 is a flowchart of an example method 900 to initiate remote-park assist via a mobile interface. The flowchart of FIG. 9 is representative of machine readable instructions that are stored in memory (such as the memory 704 of FIG. 4, the memory 812 of FIG. 8) and include one or more programs that are executed by a processor (such as the processor 702 of FIG. 7, the processor 810 of FIG. 8). While the example program is described with reference to the flowchart illustrated in FIG. 9, many other methods may alternatively be used. For example, the order of execution of the blocks may be rearranged, changed, eliminated, and/or combined to perform the method 900. Further, because the method 900 is disclosed in connection with the components of FIGS. 1-8, some functions of those components will not be described in detail below.

Initially, at block 902, the processor 702 of the mobile device 108 determines whether the app 708 for remote park-assist is activated. In response to the processor 702 determining that the app 708 is not active, the method 900 remains at block 902. Otherwise, in response to the processor 702 determining that the app 708 is active, the method 900 proceeds to block 904.

At block 904, the app 708 determines whether an interface of the app 708 (e.g., the interface 202, the interface 302, the interface 402, the interface 502, the interface 602) is receiving a predefined continuous stationary input via the touchscreen 200 of the mobile device 108. For example, the app 708 determines whether a portion (e.g., one or more pixels) of the touchscreen 200 that aligns with the pushbutton 204 of the interface is currently being pressed. In response to the app 708 determining that the interface is not receiving the predefined continuous stationary input, the method 900 proceeds to block 906 at which the communication module 706 of the mobile device 108 does not send an initiation signal to the communication module 106 of the vehicle 100. Otherwise, in response to the app 708 determining that the interface is receiving the predefined continuous stationary input, the method 900 proceeds to block 908.

At block 908, the app 708 determines whether an interface of the app 708 is receiving a predefined dynamic input sequence. For example, the app 708 determines whether a portion (e.g., one or more pixels) of the touchscreen 200 that aligns with an input pad (e.g., the input pad 206) of the interface is detecting the dynamic input sequence (e.g., a tapping of and/or a continuous motion along the input pad 206). In response to the app 708 determining that the interface is not receiving the predefined dynamic input sequence, the method 900 proceeds to block 906 at which the communication module 706 of the mobile device 108 does not send the initiation signal to the vehicle 100. Otherwise, in response to the app 708 determining that the interface is receiving the predefined dynamic input sequence, the method 900 proceeds to block 910 at which the communication module 706 of the mobile device 108 sends the initiation signal to the communication module 106 of the vehicle 100.

In other examples, the app 708 determines whether the communication module 706 of the mobile device 108 is to send the initiation signal based on other predefined inputs. In some such examples, the mobile device 108 sends the initiation signal to the vehicle 100 in response to the app 708 determining that two or more predefined stationary inputs (e.g., simultaneous pressing of the pushbutton 204 and the pushbutton 404) are being received via the touchscreen 200. In other such instances, the mobile device 108 sends the initiation signal to the vehicle 100 in response to the app 708 determining, via the interface 202, that a stationary input (e.g., pressing of the pushbutton 204) is being received after a corresponding dynamic input sequence (e.g., a continuous motion along the input pad 206) has been received.

At block 912, the park-assist controller 114 determines whether the communication module 106 is receiving the initiation signal from the mobile device 108 for the remote park-assist system of the vehicle 100. In response to the park-assist controller 114 determining that the communication module 106 is currently receiving the initiation signal, the method 900 proceeds to block 914 at which the autonomy unit 112 performs autonomous driving maneuver(s) for remote park-assist. Otherwise, in response to the park-assist controller 114 determining that the communication module 106 is not currently receiving the initiation signal, the method 900 proceeds to block 916 at which the autonomy unit 112 stops the motive function(s) of the vehicle 100.

An example disclosed remote park-assist system includes a mobile device. The mobile device includes a touchscreen to present an interface. The interface includes a pushbutton to receive a continuous stationary input and an input pad to receive a dynamic input sequence. The example disclosed remote park-assist system also includes a vehicle. The vehicle includes a communication module for wireless communication with the mobile device and an autonomy unit to perform motive functions while the interface simultaneously receives the continuous stationary input and the dynamic input sequence.

In some examples, the autonomy unit is to stop performing the motive functions when the interface does not receive at least one of the continuous stationary input and the dynamic input sequence.

In some examples, the input pad includes a second pushbutton and the dynamic input sequence includes a tapping of the second pushbutton at a predefined frequency. In some examples, the input pad includes a track and the dynamic input sequence includes a continuous motion along the track.

In some examples, the mobile device is to send an initiation signal to the communication module of the vehicle while the interface simultaneously receives the continuous stationary input and the dynamic input sequence. In some such examples, the vehicle includes a controller that is to instruct the autonomy unit to perform the motive functions in response to the communication module receiving the initiation signal.

An example disclosed remote park-assist system includes a mobile app. The mobile app includes an interface for a touchscreen of a mobile device. The interface includes a pushbutton to receive a continuous stationary input and an input pad to receive a dynamic input sequence. The example disclosed remote park-assist system also includes a communication module for communication with the mobile device and an autonomy unit to perform motive functions while the interface simultaneously receives the continuous stationary input and the dynamic input sequence.

In some examples, the autonomy unit is to stop performing the motive functions when the interface does not receive at least one of the continuous stationary input and the dynamic input sequence.

In some examples, the vehicle includes range-detection sensors and the autonomy unit determines the motive functions for remote park-assist based on data collected by the range-detection sensors.

In some examples, the continuous stationary input includes a continuous pressing of the pushbutton.

In some examples, the input pad includes a second pushbutton and the dynamic input sequence includes a tapping of the second pushbutton at a predefined frequency. In some such examples, the interface further includes a metronome button to initiate a metronome for facilitating a user in tapping the second pushbutton at the predefined frequency. In some such examples, the interface further includes a frequency button that enables a user to adjust the predefined frequency.

In some examples, the input pad includes a track and the dynamic input sequence includes a continuous motion along the track. In some such examples, the mobile app determines that the interface has stopped receiving the dynamic input sequence in response to detecting a pause in the continuous motion at a center portion of the track. In some such examples, the mobile app determines that the interface has stopped receiving the dynamic input sequence in response to detecting a pause in the continuous motion that occurs at an end portion of the track and exceeds a predefined period of time.

In some examples, the vehicle includes a controller that instructs the autonomy unit to perform the motive functions as the communication module receives an initiation signal from the mobile device. In some such examples, the controller is to instruct the autonomy unit to perform the motive functions in response to the communication module receiving the initiation signal and the controller determining the mobile device is within a predetermined distance of the vehicle. Further, in some such examples, the controller is to determine a distance between the mobile device and the vehicle based on a distance characteristic of the initiation signal.

An example disclosed method includes receiving, via a touchscreen of a mobile device, a continuous stationary input via a pushbutton of an interface and a dynamic input sequence via an input pad of the interface. The example disclosed method also includes communicating, via the mobile device, an initiation signal while simultaneously receiving the continuous stationary input and the dynamic input sequence and performing, via an autonomy unit of a vehicle, motive functions for remote park-assist while the vehicle receives the initiation signal.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module" and "unit" refer to hardware with circuitry to provide communication, control and/or monitoring capabilities. A "module" and a "unit" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:
1. A remote park-assist system, comprising:
  a mobile device including a touchscreen to present an interface that includes:
    a first pushbutton for receiving a continuous stationary input; and an input pad for receiving a dynamic input sequence; and a vehicle including:

a communication module comprising a network interface configured to perform wireless communication with the mobile device; and an autonomy unit comprising an electronic control unit configured to perform motive functions while the interface simultaneously receives the continuous stationary input and the dynamic input sequence, wherein the continuous stationary input is configured to be received at a first region of the interface in an uninterrupted manner over a period of time, and wherein the dynamic input sequence comprises a non-stationary input that is configured to be received at a second region of the interface over the period of time, wherein the first region and the second region are separate, wherein the input pad includes a second pushbutton and the dynamic input sequence includes a tapping of the second pushbutton at a tapping frequency, wherein the autonomy unit is further configured to change a speed of the vehicle based on a change of the tapping frequency.

2. The remote park-assist system of claim 1, wherein the autonomy unit is to stop performing the motive functions when the interface does not receive at least one of the continuous stationary input and the dynamic input sequence.

3. The remote park-assist system of claim 1, wherein the input pad includes a track and the dynamic input sequence includes a continuous motion along the track.

4. The remote park-assist system of claim 1, wherein the mobile device is to send an initiation signal to the communication module of the vehicle while the interface simultaneously receives the continuous stationary input and the dynamic input sequence.

5. The remote park-assist system of claim 4, wherein the vehicle includes a controller that is to instruct the autonomy unit to perform the motive functions in response to the communication module receiving the initiation signal.

6. The remote park-assist system of claim 1, wherein the input pad further includes a metronome button to initiate a metronome for facilitating a user in tapping the second pushbutton at the tapping frequency.

7. The remote park-assist system of claim 1, wherein the input pad further includes a frequency button that enables a user to adjust the tapping frequency.

8. A remote park-assist system, comprising:

a mobile app including an interface for a touchscreen of a mobile device, the interface including:

a first pushbutton for receiving a continuous stationary input; and an input pad for receiving a dynamic input sequence, and a vehicle including:

a communication module comprising a network interface configured to perform communication with the mobile device; and an autonomy unit configured to perform motive functions while the interface simultaneously receives the continuous stationary input and the dynamic input sequence, wherein the continuous stationary input is configured to be received at a first region of the interface in an uninterrupted manner over a period of time, and wherein the dynamic input sequence comprises a non-stationary input that is configured to be received at a second region of the interface over the period of time, wherein the first region and the second region are separate, wherein the input pad includes a second pushbutton and the dynamic input sequence includes a tapping of the second pushbutton at a tapping frequency, wherein the autonomy unit is further configured to change a speed of the vehicle based on a change of the tapping frequency.

9. The remote park-assist system of claim 8, wherein the autonomy unit is to stop performing the motive functions when the interface does not receive at least one of the continuous stationary input and the dynamic input sequence.

10. The remote park-assist system of claim 8, wherein the vehicle includes range- detection sensors and the autonomy unit determines the motive functions for remote park-assist based on data collected by the range-detection sensors.

11. The remote park-assist system of claim 8, wherein the continuous stationary input includes a continuous pressing of the first pushbutton.

12. The remote park-assist system of claim 8, wherein the interface further includes a metronome button to initiate a metronome for facilitating a user in tapping the second pushbutton at the tapping frequency.

13. The remote park-assist system of claim 8, wherein the interface further includes a frequency button that enables a user to adjust the tapping frequency.

14. The remote park-assist system of claim 8, wherein the input pad includes a track and the dynamic input sequence includes a continuous motion along the track.

15. The remote park-assist system of claim 14, wherein the mobile app determines that the interface has stopped receiving the dynamic input sequence in response to detecting a pause in the continuous motion at a center portion of the track.

16. The remote park-assist system of claim 14, wherein the mobile app determines that the interface has stopped receiving the dynamic input sequence in response to detecting a pause in the continuous motion that occurs at an end portion of the track and exceeds a predefined period of time.

17. The remote park-assist system of claim 8, wherein the vehicle includes a controller that instructs the autonomy unit to perform the motive functions as the communication module receives an initiation signal from the mobile device.

18. The remote park-assist system of claim 17, wherein the controller is to instruct the autonomy unit to perform the motive functions in response to the communication module receiving the initiation signal and the controller determining the mobile device is within a predetermined distance of the vehicle.

19. The remote park-assist system of claim 18, wherein the controller is to determine a distance between the mobile device and the vehicle based on a distance characteristic of the initiation signal.

20. A method comprising:

receiving, via a touchscreen of a mobile device, a continuous stationary input via a first pushbutton of an interface and a dynamic input sequence via an input pad of the interface;

communicating, via the mobile device, an initiation signal while simultaneously receiving the continuous stationary input and the dynamic input sequence, wherein the continuous stationary input is configured to be received at a first region of the interface in an uninterrupted manner over a period of time, and wherein the dynamic input sequence comprises a non- stationary input that is configured to be received at a second region of the interface over the period of time, wherein the first region and the second region are separate; and performing, via an autonomy unit of a vehicle, motive functions for remote park-assist while the vehicle receives the initiation signal;

receiving a tapping input at a tapping frequency via a second pushbutton of the input pad;

changing a speed of the vehicle based on a change of the tapping frequency.

* * * * *